United States Patent Office 3,284,221
Patented Nov. 8, 1966

3,284,221
PROCESS FOR THE MANUFACTURE OF COLD-WATER DISPERSIBLE ADHESIVES
John W. Huebschmann and John H. Wrightsman, Decatur, Ill., assignors to A. E. Staley Manufacturing Company, Decatur, Ill., a corporation of Delaware
No Drawing. Filed Apr. 23, 1963, Ser. No. 274,931
5 Claims. (Cl. 106—213)

This invention relates to a process for the manufacture of adhesive and more particularly, to a process for the manufacture of dry, cold-water-soluble adhesives.

Liquid dextrin compositions have long been used as adhesives for bags, cartons, tube windings, and other similar industrial applications. Such adhesives are easily prepared by heating mixtures of dextrin, borax and sodium hydroxide in water. The solids portion of liquid adhesives usually ranges from about 20 to 40% by weight based on the weight of the liquid adhesive composition. The lower solids adhesives are most useful where slower drying times are permitted, whereas the higher solids adhesives are most useful where quick drying times are necessary. The principal drawback of such adhesives is that the user must either have facilities to prepare the adhesives at the point of use, or he must pay for the transportation to the place of use of the water contained in the liquid adhesives composition. Mainly because of these drawbacks, dry, cold-water-soluble adhesives were developed which could be formed into liquid adhesives at the point of manufacture merely by adding the dry material to cold water. Cold-water-soluble adhesives consist of dextrin blended with borax and an alkaline earth or alkali metal hydroxide and are prepared by blending dextrin and other ingredients in water and then drying and grinding the blended material to give a cold-water-soluble adhesive. The dry, cold-water-soluble adhesives can then be reconstituted in water to give a liquid adhesive having the desired percentage of solids.

Blended cold-water-soluble adhesives, of the above type, have been found to have a number of disadvantages not possessed by the common liquid dextrin adhesives. These disadvantages include lumping during mixture with cold water, insufficient degree of tackiness and poor solubility in water. A multitude of solutions have been proposed to eliminate these problems. These solutions, however, tend to be expensive and time consuming and often are only partially effective. In addition, the process for making the dry, cold-water-soluble adhesives even without additional treatment to eliminate these problems is expensive in that the starch material is first ground and then converted to a dextrin, and then this converted product must be dispersed again in water and dried and ground a second time.

We have now discovered a novel process whereby dry, cold-water-soluble adhesives of high quality possessing none of the above drawbacks can be produced. Our process is both economical and efficient and can be conveniently carried out without the use of specially designed equipment. An additional advantage of our process is that it requires only one drying and grinding operation.

Generally, our process consists of subjecting a starch mixture to acid hydrolysis at dextrinizing temperatures in an aqueous medium in the presence of from about 0.1 to about 3% by weight terpineol, the said starch mixture containing on a dry substance basis not less than about 5% by weight of oxidized starch, the weights based on the weight of the starch dry substance. There is obtained an aqueous dispersion containing a hydrolyzed product, the product having a Brookfield viscosity at 85° F. and 20 r.p.m. ranging from about 50 to about 20,000 cps. when measured in water at a solids content of 26%. Borax is then added and the product is allowed to cool to a temperature not in excess of about 150° F. The pH of the cooled product is then adjusted to form about 8.5 to about 9.8 and the product is dried and ground to obtain a dry, cold-water-soluble amylaceous adhesive. This cold-water-soluble product can then be dissolved in the desired amount of water to give a high quality adhesive composition.

The starch mixture utilized in our process must contain not less than 5% oxidized starch and preferably, for optimum results, should contain from about 10 to about 15% of oxidized starch. The remaining starch in the mixture can be modified or derivatized starches or unmodified raw starch. From an economic standpoint, an important advantage of our process is that the principal starch ingredient can be unmodified raw starch which has not been subjected to expensive modification. Because of this, it is preferably to utilize a starch mixture containing at least 85% by weight of native starch and the use of modified starches other than the necessary amount of oxidized starch is unnecessary and impractical in our process. The starch starting material used in our process may be obtained by known methods from corn, tapioca, potato, sago, waxy corn, arrowroot and other similar sources. For economic reasons we prefer to utilize corn starch.

The amount of terpineol that can be utilized in our process will vary. When less than 0.1% and more than 3% by weight terpineol is utilized in our process, the tack of the adhesive produced is adversely affected. Optimum tack is obtained when from about 0.3 to about 1% of terpineol is utilized. The most widely used form of terpineol is a product known in commerce as terpineol extra which is a mixture of alpha and beta terpineols. Other sources of terpineol such as pine oil may also be utilized in our process.

The acid hydrolysis step of our invention is carried out at elevated temperatures under pressure in the presence of an acid catalyst, such as hydrochloric acid, sulfuric acid, acetic acid or phosphoric acid, in a closed reaction vessel.

The temperatures of acid hydrolysis are preferably maintained at between about 200° F. and 270° F. under pressure, for at temperatures below 200° F. the hydrolysis of the starch is too slow and is more difficult to control, whereas at temperatures above 270° F. excessive colorization of the hydrolyzed material occurs. The solids content of the aqueous mixture to be hydrolyzed in our process can vary over a wide range. However, it is generally not convenient when utilizing standard pressurized equipment to employ aqueous mixtures having a solids content of over 40% nor is it economical to employ aqueous mixtures containing less than 20% solids because of the extra cost of removing the water during drying. Preferably, from the standpoints of ease of operation and drying, aqeous mixtures containing from about 25 to about 30% solids are most conveniently employed.

The acid hydrolysis step of our process is allowed to proceed until a product having a Brookfield viscosity at 85° F. and at 20 r.p.m. ranging from about 50 to about 20,000 cps. when the product is measured at a dry solids content of 26% is achieved. Although this viscosity range can be utilized in producing dry adhesives which can be satisfactorily employed over a wide range of solids concentrations when dispersed in water, specific viscosity ranges have been found to produce products which gave optimum results when used at chosen solids concentrations. For example, when an adhesive used at 20% solids is desired, a viscosity ranging from about 8,000 to about 10,000 is most suitable in our process. When a 30% solids adhesive is desired, the viscosity range is preferably about 1,000 to about 1,600. When a 40% solids adhesive is desired, the viscosity of the product at the completion of the acid hydrolysis step is preferably between about 100 and about 300.

In our process, quantities of borax ranging from as low as 7% to as high as 25% and even higher by weight, the weight based on the weight of the starch dry substance, can be satisfactorily utilized to obtain a final product which when reconstituted in water, will have satisfactory tack. The weight percents given are based on 10 mol borax which, of course, is sodium tetraborate decahydrate. However, other forms of borax such as sodium tetraborate pentahydrate may be utilized, naturally making allowance for the different amounts of water in the borax material. Generally, we have found that optimum tack is obtained when from about 15 to about 20% by weight borax calculated as 10 mol borax is utilized.

The borax is added to the hydrolyzed product after cessation of hydrolysis. Because the addition of borax effectively *prohibits* further hydrolysis, it is preferable, in order to avoid excessive hydrolysis of the starch, to add borax immediately after cessation of hydrolysis. An alternate procedure consists of slowing the hydrolysis by allowing the product to cool before addition of borax.

After addition of borax, the pH of the resulting product is adjusted upward to from about 8.5 to about 9.8 with an alkali metal hydroxide or an alkaline earth metal hydroxide, for example, sodium hydroxide, potassium hydroxide, or calcium hydroxide. The preferable pH within this range again depends on the solids content desired for the final reconstituted adhesive product. The product which is most effective at approximately 20% solids is preferably adjusted to a pH of about 9.4 to about 9.6 whereas the products which are most effective at a 30% or a 40% solids concentration are preferably adjusted to pHs of 9.2 to 9.4 and 8.8 to 9.2, respectively. Sodium hydroxide is the preferred reagent for adjusting pH in our process for caustic also acts as an aid for borax in giving increased tack to the final adhesive. In order to avoid colorization of the final product, it is necessary to allow the material to cool to a temperature of 150° F. or lower before addition of hydroxide.

After the pH adjustment, the material may be dried and ground by any conventional means. Suitable drying procedures include the well-known spray-drying and roll-drying methods, either of which can be successfully employed. After drying, it is then preferable to grind the dried material to obtain a dry cold water soluble adhesive of useful particle size.

Although they are not essential in producing satisfactory dry, cold-water-soluble adhesives, additives such as preservatives, bleaches and defoamers may be incorporated into the adhesives compositions produced by our process.

Small amounts of preservatives serve to destroy noxious microorganisms which can cause contamination in the adhesives product. Examples of preservatives which can be utilized in our process include the sodium salt of o-phenylphenol, copper sulfate, formaldehyde, zinc sulfate, the sodium salt of pentachlorophenol, etc. and the like. Such preservatives are most effectively utilized in amounts ranging from about 0.1 to about 2% by weight based on the weight of the starch dry substance. The preservatives should not be incorporated into our adhesives before the cessation of acid hydrolysis and are most conveniently added in accompaniment with borax.

Small amounts of defoaming agents on the order of from about 0.1 to about 0.5% by weight, the weight based on the starch dry substance, are effective in preventing the formation of troublesome foam when our adhesives are reconstituted and utilized. Examples of suitable defoaming agents include tributylphosphate, tributylcitrate, heptanol, oleic acid, stearic acid, etc and the like.

When a product especially light in color is desired, small amounts of bleaches on the order of 0.1 to 1% by weight based on the weight of starch dry substance can be employed. Suitable bleaches include sodium bisulfite and hydrogen peroxide. Both the bleaching and the defoaming agents should not be incorporated into an adhesive before cessation of acid hydrolysis and are most conveniently added in accompaniment with borax.

The following examples serve to further illustrate our invention, however, we do not intend to be limited to the details disclosed therein.

Example I 1000 weight parts of a starch mixture were placed in a pressure equipped reaction vessel, the said starch mixture containing 875 weight parts of pearl form corn starch and 125 weight parts of oxidized starch. To this material was added sufficient water to give an aqueous mixture of 15.5° Bé. at 60° F. To the resulting mixture were then added 5 weight parts of terpineol extra and 5 weight parts of 20° Bé. hydrochloric acid. The resulting aqueous dispersion was heated to a temperature of about 235° F. under a pressure of approximately 9 p.s.i.g. and maintained under these conditions until a Brookfield viscosity of 9000 cps. at 85° F. and 20 r.p.m. when measured at 26% solids was obtained. The material was then transferred to an open vessel. To the thus treated material were then added 180 parts of 10 mol borax. Small amounts of bleach, defoamer and preservative were also added at this time. The resulting aqueous mixture was then allowed to cool to approximately 140° F. and the pH of the cooled material was then adjusted to about 9.5 with sodium hydroxide. The pH adjusted material was then dried on roll driers to about 8–10% moisture and ground. Eighty grams of the resulting dry cold-water-soluble adhesive composition were then added to a 600 ml. beaker containing 320 grams of distilled water with accompanying agitation, the water being at a temperature of approximately 80° F. The dry material readily dissolved in the water without lumping. After 60 minutes of agitation the Brookfield viscosity of the dispersion measured at 80° F. and 20 r.p.m. was approximately 1200 cps. and the pH of the dispersion was 9.4.

Example II

The process of Example I was carried out to obtain a dry cold-water-soluble adhesive with the exceptions that the acid hydrolysis of the product was carried to a viscosity of 1200 cps. and the pH was adjusted to 9.3. 120 grams of the resulting dry cold-water-soluble adhesive composition were then added to a 600 ml. beaker containing 280 grams of distilled water with accompanying agitation, the water being at a temperature of approximately 80° F. The dry material readily dissolved in water without lumping. After 60 minutes of agitation, the Brookfield viscosity of the dispersion measured at 80° F. and 20 r.p.m. was approximately 1200 cps. and the material had a pH of 9.3.

Example III

The process of Example I was carried out to obtain a dry cold-water-soluble adhesive with the exceptions that the acid hydrolysis of the product was carried to a viscosity of 200 cps. and the pH was adjusted to 9.0. 160 grams of the resulting dry cold-water-soluble adhesive composition were then added to a 600 ml. beaker containing 240 grams distilled water with accompany agitation, the water being at a temperature of approximately 80° F. The dry material readily dissolved in the water without lumping. After 60 minutes of agitation the Brookfield viscosity of the dispersion measured at 80° F. and 20 r.p.m. was approximately 1200 cps. and the material had a pH of 9.0.

Example IV

The process of Example I was followed with the exception that pine oil was utilized instead of terpineol. A dry cold-water-soluble adhesive was obtained.

Since many embodiments of this invention may be made and since many changes may be made in the embodiments described, the foregoing is to be interpreted as illustrative only and our invention is defined by the claims appended hereafter.

We claim:

1. A process for producing dry, cold-water-soluble amylaceous adhesives which comprises acid hydrolyzing at a temperature of from about 200° F. to about 270° F. an aqueous dispersion of a starch mixture in the presence of from about 0.1 to about 3% by weight terpineol based on the weight of the starch dry substance to obtain a hydrolyzed product having a Brookfield viscosity at 85° F. and 20 r.p.m. ranging from about 50 to about 20,000 cps. when measured in water at a solids content of 26%, the said mixture containing on a dry substance basis not less than 5% by weight of an oxidized starch and at least 85% by weight of native starch, adding to the said hydrolyzed product from about 7 to about 25% by weight borax based on the weight of the starch dry substance, then cooling the resulting mixture to a temperature of less than 150° F., adjusting the pH of the mixture to from about 8.5 to about 9.8 with a compound selected from the group consisting of alkali metal hydroxides and alkaline earth metal hydroxides and drying the resulting composition to obtain a dry cold-water-soluble adhesive.

2. A process for producing dry, cold-water-soluble amylaceous adhesives which comprises subjecting an aqueous dispersion of a starch mixture to acid hydrolysis at a temperature of from 200° F. to about 270° F. and in the presence of from about 0.3 to about 1% by weight of terpineol to obtain a hydrolyzed product having a Brookfield viscosity at 85° F. and 20 r.p.m. ranging from about 100 to about 10,000 cps. when measured in water at a solids content of 26%, the said mixture containing on a dry solids basis from about 10 to about 15% by weight of an oxidized starch and from about 90 to about 85% by weight of native starch, all weights based on the weight of the starch dry substance, adding to the said hydrolyzed product from about 7 to about 25% by weight borax based on the weight of the starch dry substance, then cooling the resulting mixture to a temperature of less than 150° F., adjusting the pH of the mixture to from about 8.5 to about 9.8 with a compound selected from the group consisting of alkali metal hydroxides and alkaline earth metal hydroxides, drying and grinding the resulting composition to obtain a dry, cold-water-soluble adhesive.

3. The process of claim 2 wherein the viscosity is 8000 to 10,000 and the pH is 9.4 to 9.6.

4. The process of claim 2 wherein the viscosity is 1000 to 500 cps. and the pH is 9.2 to 9.4.

5. The process of claim 2 wherein the viscosity is 100 to 300 and the pH is 8.8 to 9.1.

References Cited by the Examiner

UNITED STATES PATENTS

| | | | |
|---|---|---|---|
| 1,691,065 | 11/1928 | Humphrey | 260—93.3 |
| 1,697,275 | 1/1929 | Gray | 260—93.3 |
| 2,346,791 | 4/1944 | Rummelsburg | 106—212 |
| 2,368,767 | 2/1945 | Moore | 106—211 |
| 2,856,307 | 10/1958 | Fredrickson | 106—213 |
| 2,994,615 | 8/1961 | McDonald | 106—213 |
| 3,097,102 | 7/1963 | Moes | 106—213 |

FOREIGN PATENTS 604,451   7/1948   Great Britain.

ALEXANDER H. BRODMERKEL, *Primary Examiner.*

L. HAYES, *Assistant Examiner.*